(12) United States Patent
Katzourakis et al.

(10) Patent No.: US 10,996,673 B1
(45) Date of Patent: May 4, 2021

(54) MANUAL OVERRIDE

(71) Applicants: Diomidis Katzourakis, Chania (GR); Ioannis N. Tzortzis, Sunnyvale, CA (US)

(72) Inventors: Diomidis Katzourakis, Chania (GR); Ioannis N. Tzortzis, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/015,711

(22) Filed: Sep. 9, 2020

Related U.S. Application Data

(63) Continuation of application No. 16/143,957, filed on Sep. 27, 2018, now abandoned.

(60) Provisional application No. 62/564,324, filed on Sep. 28, 2017.

(51) Int. Cl.
*G05D 1/00* (2006.01)
*G05D 1/02* (2020.01)

(52) U.S. Cl.
CPC .......... *G05D 1/0061* (2013.01); *G05D 1/021* (2013.01)

(58) Field of Classification Search
CPC .............................. G05D 1/0061; G05D 1/021
See application file for complete search history.

(56) References Cited

U.S. PATENT DOCUMENTS

| | | | |
|---|---|---|---|
| 5,941,338 A * | 8/1999 | Miller ..................... | B62D 6/04 180/421 |
| 6,256,561 B1 * | 7/2001 | Asanuma ............... | B62D 1/286 180/197 |
| 6,535,806 B2 | 3/2003 | Millsap et al. | |
| 6,575,263 B2 | 6/2003 | Hjelsand et al. | |
| 6,675,928 B2 * | 1/2004 | Takai ..................... | B62D 5/065 180/422 |
| 6,678,595 B2 | 1/2004 | Zheng et al. | |
| 7,295,905 B2 | 11/2007 | Yao et al. | |
| 8,170,751 B2 | 5/2012 | Lee et al. | |
| 8,374,743 B2 | 2/2013 | Salinger | |
| 8,880,287 B2 | 11/2014 | Lee et al. | |
| 8,954,235 B2 | 2/2015 | Lee et al. | |
| 8,965,633 B2 | 2/2015 | Lee et al. | |
| 8,994,521 B2 | 3/2015 | Gazit | |
| 9,073,576 B2 | 7/2015 | Lee et al. | |

(Continued)

FOREIGN PATENT DOCUMENTS

DE 19921307 A1 11/2000
WO 2006099483 A1 9/2006

OTHER PUBLICATIONS

McHugh, Molly, "Tesla's Cars Now Drive Themselves, Kinda", Wired.com, Gear, https://www.wired.com/2015/10/tesla-self-driving-over-air-update-live/, Oct. 14, 2015 (8 pp).

*Primary Examiner* — Hussein Elchanti
(74) *Attorney, Agent, or Firm* — Young Basile Hanlon & MacFarlane, P.C.

(57) ABSTRACT

A method of control includes operating in autonomous mode and steering according to a tracking angle. The method also includes receiving a torque signal indicating a measured torque being applied to a steering control device and determining a difference between an expected torque and the measured torque, and based on a direction of the expected torque, the direction of the measured torque, and the difference between the two, switching from autonomous mode of operation to manual mode operation.

25 Claims, 9 Drawing Sheets

(56) References Cited

U.S. PATENT DOCUMENTS

| | | | |
|---|---|---|---|
| 2002/0042671 A1* | 4/2002 | Chen | B60K 28/16 |
| | | | 701/41 |
| 2004/0204808 A1* | 10/2004 | Satoh | B62D 15/025 |
| | | | 701/41 |
| 2008/0078608 A1* | 4/2008 | Hara | B62D 5/0484 |
| | | | 180/446 |
| 2008/0080740 A1 | 4/2008 | Kaufmann | |
| 2008/0091318 A1* | 4/2008 | Deng | B62D 6/003 |
| | | | 701/41 |
| 2008/0183342 A1 | 7/2008 | Kaufmann et al. | |
| 2010/0152952 A1 | 6/2010 | Lee et al. | |
| 2011/0077824 A1* | 3/2011 | Barton | B62D 6/005 |
| | | | 701/42 |
| 2011/0190972 A1 | 8/2011 | Timmons et al. | |
| 2012/0166032 A1 | 6/2012 | Lee et al. | |
| 2012/0283907 A1 | 11/2012 | Lee et al. | |
| 2012/0283912 A1 | 11/2012 | Lee et al. | |
| 2012/0314070 A1 | 12/2012 | Zhang et al. | |
| 2013/0060414 A1 | 3/2013 | Lee et al. | |
| 2013/0131907 A1 | 5/2013 | Green et al. | |
| 2013/0253793 A1 | 9/2013 | Lee et al. | |
| 2014/0139341 A1 | 5/2014 | Green et al. | |
| 2015/0210273 A1 | 7/2015 | Kaufmann et al. | |
| 2016/0137221 A1 | 5/2016 | Mose et al. | |
| 2016/0304123 A1 | 10/2016 | Lewis et al. | |
| 2017/0029021 A1 | 2/2017 | Lee et al. | |
| 2017/0158222 A1 | 6/2017 | Schulz et al. | |
| 2017/0267285 A1 | 9/2017 | Abbas et al. | |
| 2017/0361872 A1 | 12/2017 | Gupta et al. | |
| 2018/0170326 A1 | 6/2018 | Wang et al. | |

\* cited by examiner

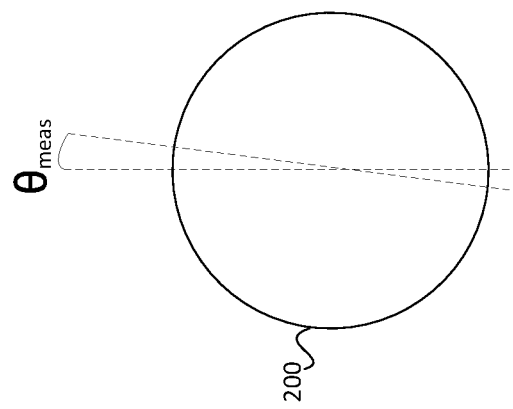
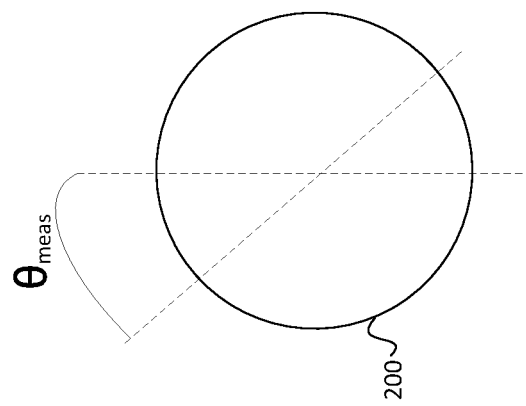
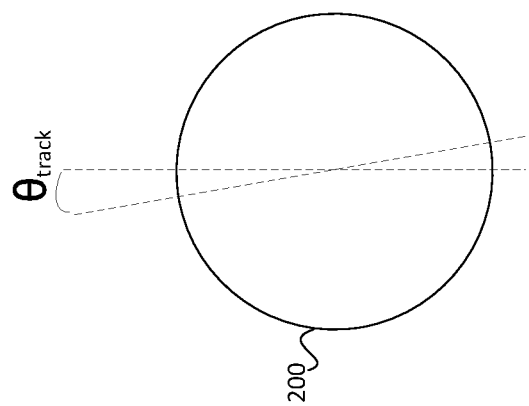

MANUAL OVERRIDE

CROSS-REFERENCE TO RELATED APPLICATIONS

This application is a continuation of U.S. patent application Ser. No. 16/143,957, filed on Sep. 27, 2018, which claims priority to and the benefit of U.S. Provisional Patent Application No. 62/564,324, filed Sep. 28, 2017, the entire disclosures of which are incorporated by reference herein.

TECHNICAL FIELD

The present disclosure relates systems and methods for determining when to override autonomous steering mode of a vehicle to a manual steering mode.

BACKGROUND

Autonomous vehicles are configured to control various operations, such as acceleration, braking, and steering, without human input. The autonomous vehicle may require or allow a human operator to take control in different circumstances, for example, when the human operator desires to override autonomous operations or simply desires to drive the vehicle.

SUMMARY

In one implementation, a steering system is provided for an autonomous vehicle, which can be operated autonomously or manually. The steering system includes a steering wheel, a steering shaft, a steering wheel motor, a torque sensor, and a steering controller. The steering shaft is coupled to the steering wheel. The steering wheel motor is coupled to the steering shaft and is configured to apply a torque to the steering shaft. The torque sensor is coupled to the steering shaft and outputs a signal indicating an amount of torque being applied to the steering shaft. The steering controller is in communication with the torque sensor and the steering wheel motor. The steering controller is configured to: operate a vehicle in autonomous mode; receive an instruction to adjust a trajectory of the vehicle; instruct the steering wheel motor to apply a requested torque to the steering shaft of the vehicle, the requested torque rotating the steering wheel in a direction of the requested torque to a tracking angle relative to a reference position of the steering wheel; receive a torque signal indicating an amount of measured torque being applied to the steering shaft and a direction of the measured torque; determine a difference between an expected torque and the measured torque, wherein the expected torque is a torque value expected to be indicated by the torque signal given the requested torque; determine whether the vehicle is in a first torque condition based on the direction of the expected torque, the direction of the measured torque, and the difference between the expected torque and the measured torque; and override the autonomous mode of the vehicle and operating the vehicle in a manual mode when the vehicle is in the first torque condition.

In another implementation, a method is provided for controlling a vehicle, which includes: operating a vehicle in autonomous mode, wherein operating the vehicle in autonomous mode includes receiving an instruction to adjust a trajectory of the vehicle; applying a requested torque to a steering shaft of the vehicle, the steering shaft being connected to a steering wheel of the vehicle and the requested torque being for rotating the steering wheel in a direction of the requested torque to a tracking angle relative to a reference position of the steering wheel; receiving a torque signal indicating an amount of measured torque being applied to the steering shaft and a direction of the measured torque; determining a difference between an expected torque and the measured torque, wherein the expected torque is a torque value expected to be indicated by the torque signal given the requested torque; determining whether the vehicle is in a first torque condition based on a direction of the expected torque, the direction of the measured torque, and the difference between the expected torque and the measured torque; and when the vehicle is in the first torque condition, overriding the autonomous mode of the vehicle and operating the vehicle in a manual mode.

In another implementation, a method is provided for controlling a vehicle, which includes: operating a vehicle in autonomous mode, wherein operating the vehicle in autonomous mode includes receiving an instruction to adjust a trajectory of the vehicle; applying a requested torque to a steering shaft of the vehicle, the steering shaft being connected to a steering wheel of the vehicle and the requested torque being for rotating the steering wheel in a direction of the requested torque to a tracking angle relative to a reference position of the steering wheel; receiving a torque signal indicating an amount of measured torque being applied to the steering shaft and a direction of the measured torque; receiving an angle signal indicating a measured angle of the steering wheel with respect to a reference position of the steering wheel; and determining whether to override the autonomous mode based on an expected angle for the tracking angle and the measured angle.

BRIEF DESCRIPTION OF THE DRAWINGS

FIGS. 2A-2C are schematics that illustrate examples of different angles of a steering wheel.

DETAILED DESCRIPTION

Figure 1A:
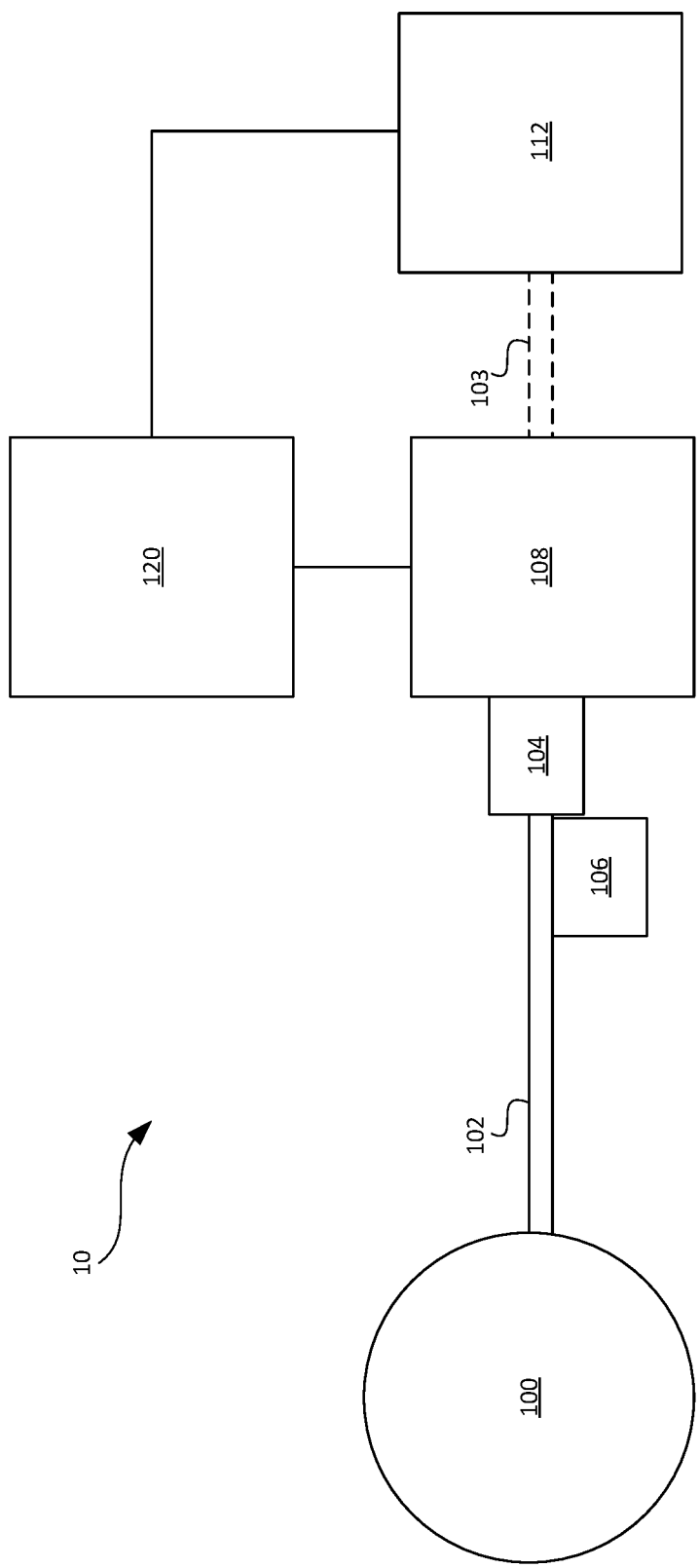
FIG. 1A is a schematic that illustrates an example set of components of a vehicle steering system.

An autonomous vehicle may refer to any vehicle that may be controlled in an autonomous manner. Autonomous vehicles may be fully autonomous or semi-autonomous. An autonomous vehicle may require or permit a human operator (referred to as a "passenger" or "driver") to sit in front of the steering wheel. The vehicle may operate in an autonomous mode or a manual mode. When in autonomous mode, the vehicle may be tasked with controlling the speed and trajectory of the vehicle (amongst other tasks). The driver may take over control of the vehicle and may operate the vehicle in a manual mode. When the driver feels that the vehicle is making the wrong decision, desires to change the course of the vehicle, or merely wishes to drive the vehicle for pleasure, the driver may override an autonomous mode of the vehicle, which switches the vehicle to manual mode. For example, the vehicle may embark on the wrong route and the driver may wish to correct the route of the vehicle. In another example, the driver may simply want to start driving the vehicle. In yet another example, the driver may be uncomfortable with the manner by which the vehicle is driving and may wish to override the autonomous mode of the vehicle. In such situations, it is beneficial for the vehicle to be configured to allow the user to efficiently switch from autonomous mode to a manual mode. Furthermore, it is also beneficial for the transition to be handled in a manner that provides the least disturbance for the passengers in the vehicle and the other vehicles on the road.

As will be discussed below, systems and methods for enabling a driver to override an autonomous mode of the vehicle are presented. Overriding the autonomous mode may refer to the situation where the driver instructs the autonomous vehicle that he or she intends on taking over control of the vehicle. The driver may apply a torque to the steering wheel, thereby notifying the vehicle of an intention to override the autonomous mode of the vehicle. In operation, the vehicle takes into consideration the magnitude and direction of torque applied by the driver to the steering wheel to determine the driver's intention. In autonomous mode, the vehicle may move the steering wheel to track the direction of the vehicle (e.g., to visually indicate to the user the direction of the vehicle), which is considered when assessing the magnitude and the direction of the driver torque applied to the steering wheel 100.

In making these determinations, the vehicle determines if the vehicle is in a first torque condition (e.g., the driver's interaction with the steering wheel is "super active"), a second torque condition (e.g., the driver's interaction is "active"), or a third torque condition (e.g., the driver's interaction is "not active"). A torque condition may refer to the sensed interaction between the driver and the steering wheel relative to an expected torque related to tracking direction with the steering wheel. In response to determining that the vehicle is in the first torque condition, the vehicle overrides the autonomous mode and turns over control to the driver with no other conditions. In response to determining that the vehicle is in the second torque condition, the vehicle continues in autonomous mode and continues to monitor the current condition of the vehicle for a predetermined time period. If the condition remains for the duration of the predetermined time period, the vehicle switches to manual mode. In response to determining that the vehicle is in the third torque condition, the vehicle continues to operate in autonomous mode. Additionally or alternatively, the vehicle takes into consideration the difference between a tracking angle of the steering wheel and the measured angle of the steering wheel, and the amount of time that the steering wheel remains at the measured angle to determine the driver's intention.

FIG. 1A illustrates an example steering system 10 of an autonomous vehicle. The steering system 10 includes a steering wheel 100, a steering shaft 102, a torque sensor 104, an angle sensor 106, a steering wheel motor 108, a transform component 110, and a steering controller 120. The steering system 10 includes other components not shown herein. For example, the steering system 10 includes tires and a steering linkage, the orientation of which are controlled by the steering system 10. The steering wheel 100 is coupled to the steering shaft 102. The transform component 110 may be any mechanism (e.g., a rack and pinion arrangement) that transforms the rotational motion of the steering shaft 102 into a linear translation of the steering linkage. The steering system 10 may, for example, be a "steer-by-wire" configuration, whereby the rotational movement of the steering wheel 100 is transformed into a signal that is communicated electronically to the transform component 110, which in turn moves the steering linkage and the tires. The steering system 10 may also selectively mechanically connect the steering shaft 102 to the transform component 112, for example, via a secondary shaft 103. The steering controller 120 includes one or more suitable computing devices (e.g., comprising a processor, memory, storage, bus, and communications interface), which is in communication with the torque sensor 104, the angle sensor 106, the steering wheel motor 108, and/or he transform component 110 for receiving, processing, and/or sending signals according software programming for executing the components of the controller 120 or otherwise performing the methods described hereon.

The steering wheel motor 108 is coupled to the steering shaft 102 and is controlled by the steering controller 120. The torque sensor 104 and the angle sensor 106 may be coupled to the steering shaft 102. The torque sensor 104 outputs a torque signal that indicates an amount of torque being applied to the steering shaft 102 (which is referred to as a "measured torque"). The measured torque reflects the combination of the torque being applied to the steering shaft 102 by the steering wheel motor 108, the torque being applied by the driver via the steering wheel 100, and/or any other torque forces that are applied to the steering shaft 102. Such other forces may include friction and reaction torque from components that are accelerated by the steering wheel motor 108 and/or the driver. The torque sensor 104 may, for example, be a torsion bar torque sensor by which torque is transferred between the steering wheel motor 108 and the steering shaft 102/steering wheel 100. In other embodiments, the torque sensor 104 may be any other suitable type of torque sensor in any other suitable location (e.g., between the steering shaft 102 and the steering wheel 100).

The angle sensor 106 outputs an angle signal that indicates an angle of the steering shaft 102/steering wheel 100 in relation to a rest position of the steering wheel 100 (which is referred to as a "measured angle"). The rest position of the steering wheel 100 may refer to any suitable reference position of the steering wheel 100. For instance, in some implementations the steering wheel 100 may be considered at the rest position when it is in a position that corresponds to driving in a straight path (e.g., the "12 O'clock" orientation). In some implementations, the torque sensor 104 and the angle sensor 106 are implemented in a single sensor.

When in autonomous mode, the steering controller 120 controls the trajectory of the vehicle. Controlling the trajectory of the vehicle may include controlling the orientation of the tires of the vehicle. In some implementations, the steering controller 120 receives a command to perform an action. An action may include changing the orientation of the tires to a certain angle (referred to as a "tire angle"). In response, the command, the steering controller 120 may control the steering system 10 to turn the tires to the tire angle.

With the steering system 10 configured as a steer-by-wire system, the steering system 10 may also turn the steering wheel 100 to visually indicate a direction of the vehicle, which may be referred to as tracking. In these implementations, the steering controller 120 instructs the steering wheel motor 108 to apply a requested torque to the steering shaft 102 to turn the steering wheel 100 for purposes of informing the driver of the vehicle's trajectory. In these implementations, the steering controller 120 may determine a tracking angle of the steering wheel 100. The tracking angle may refer to an angle of the steering wheel 100 that corresponds to a trajectory of the vehicle. For example, if the steering controller 120 determines that the car is to veer slightly to the left, the steering controller 120 may determine that the steering wheel 100 is to be slightly turned to the left to the tracking angle. In these implementations, the requested torque is the torque that is requested by the steering controller 120 to be output by the steering wheel motor 108 to turn the steering wheel 100 to the tracking angle. In response to the instruction, the steering wheel motor 108 outputs the requested torque, thereby turning the steering shaft 102 and the steering wheel 100 to the tracking angle absent error or other interference (e.g., the driver does not interact with the steering wheel 100).

The torque sensor 104 outputs a measured torque. The measured torque is the torque being applied to the steering shaft 102. The measured torque results from a combination of the requested torque that is applied to the steering shaft 102 by the steering wheel motor 108, a torque applied by the driver to the steering wheel 100, and/or any other forces that may be acting on the steering wheel 100 and/or the steering shaft 102 (as referenced above). The angle sensor 106 may output a measured angle, which is the angular displacement of the steering wheel 100 with respect to a reference position (e.g., "12 O'clock") of the steering wheel 100. Thus, the measured angle is the angle of the steering wheel 100 resulting from the forces applied to the steering wheel 100 and/or the steering shaft by the driver, the steering wheel motor 108, and/or any other source of force.

In manual mode, a driver applies a torque to the steering wheel 100 to turn the steering shaft 102. In response to the torque, the transform component 110 transforms the rotational motion of the steering shaft 102 to a linear translation of the steering linkage of the vehicle. In the steer-by-wire system, for example, the turning of the steering wheel 100 may result in a signal that is communicated to the transform component 110 that indicates a degree by which the tires are to be turned. In these implementations, the transform component 110 receives the signal and adjusts the tires in accordance with the received signal.

The steering controller 120 controls the steering system 10 when the vehicle is in autonomous mode. The steering controller 120 further determines when the driver intends on overriding the autonomous mode into manual mode. The steering controller 120 may control the steering wheel motor 108 and/or the transform component 112. Furthermore, the steering controller 120 may receive sensor signals from the torque sensor 104 and/or the angle sensor 106.

Figure 1B:
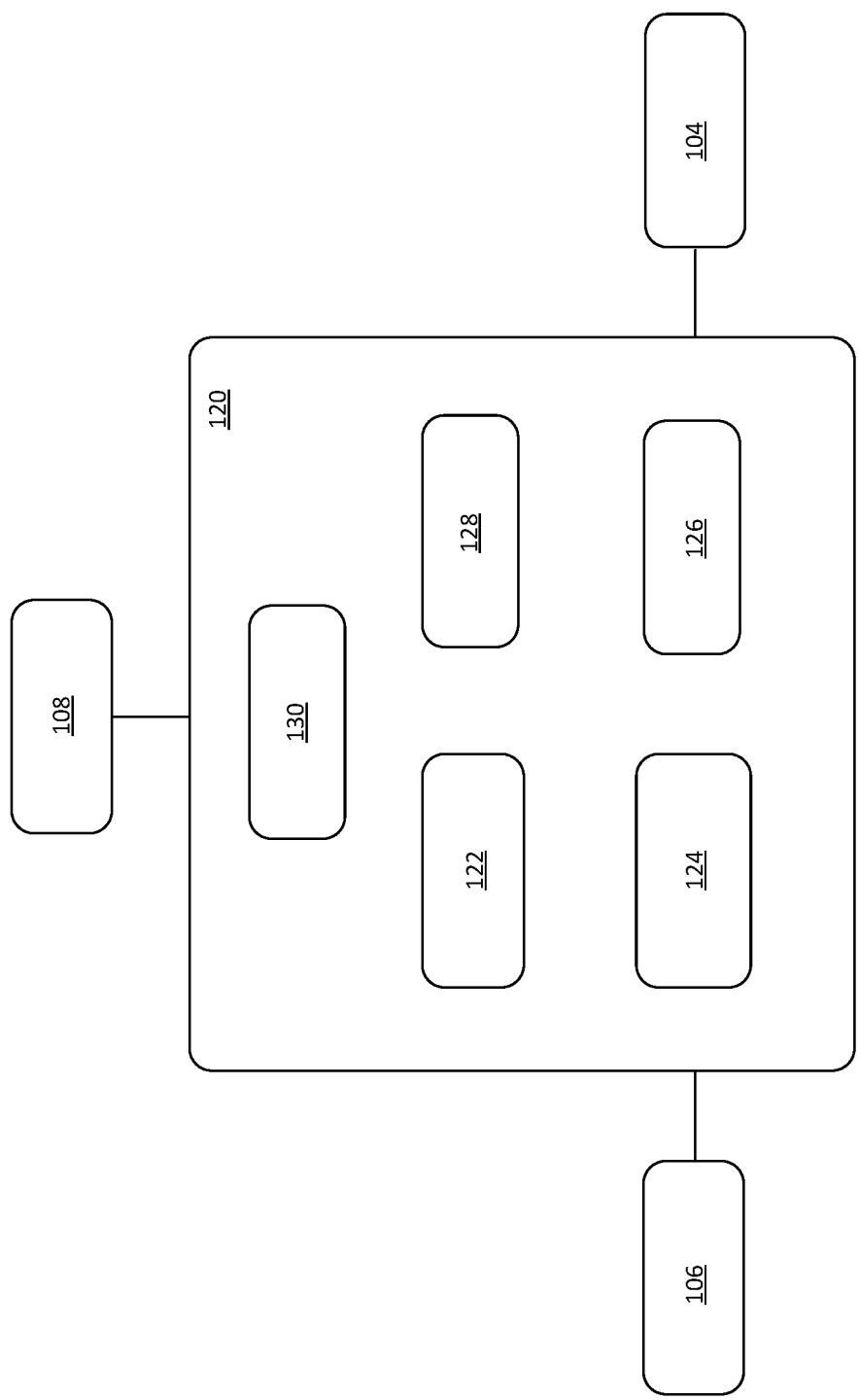
FIG. 1B is a schematic that illustrates an example set of components of a steering controller.

FIG. 1B illustrates an example steering controller 120 according to some implementations of the present disclosure. The steering controller 120 may include an autonomous override 122, an angle error determiner 124, a torque error determiner 126, a smoothing determiner 128, and an autonomous mode controller 130. The steering controller 120 may include additional and/or alternative components.

The autonomous mode controller 130 controls the steering system 10 when the vehicle is in autonomous mode. The autonomous mode controller 130 may receive commands from an upstream vehicle component indicating an action to perform. The action may indicate a tire angle and/or a tracking angle. The tire angle indicates the desired orientation of the tires. In response to the tire angle, the autonomous mode controller 130 may command the transform component 110 to laterally translate the steering linkage of the vehicle by an amount corresponding to the tire angle.

The autonomous mode controller 130 is further configured to control the steering wheel 100 when the vehicle is in autonomous mode. By controlling the steering wheel 100 when the vehicle is autonomous mode, the driver is made aware of the steering actions being performed by the vehicle. In this way, if the driver wishes to override the autonomous mode, the driver is aware of the current trajectory of the vehicle and any corrective action taken by the driver is made with an idea of the current orientation of the vehicle. In some implementations, the autonomous mode controller 130 may receive the tracking angle in the request. In other implementations, the autonomous mode controller 130 may derive the tracking angle from the tire angle. Alternatively, the autonomous mode controller 130 may look up the tracking angle in a lookup table using the tire angle. The tracking angle indicates an angle relative to the rest position of the steering wheel 100 by which to displace the steering wheel 100.

FIG. 2A illustrates a steering wheel 100 being controlled by the autonomous mode controller 130. In the illustrated example, the vehicle is being commanded to turn slightly to the left. In response, the autonomous mode controller 130 determines the tracking angle, $\theta$, and commands the steering wheel motor 108 to rotate the steering shaft 102 accordingly. In response to the command, the steering wheel motor 108 applies the torque to the steering shaft 102, thereby rotating the steering wheel 100 such that the steering wheel 100 is angularly displaced to the tracking angle, $\theta$.

In order to set the steering wheel 100 to a tracking angle, the autonomous mode controller 130 may determine a requested torque. The requested torque is the torque that is to be applied by the steering wheel motor 108 to the steering shaft 102 to turn the steering wheel 100 to the tracking angle. The autonomous mode controller 130 may determine the requested torque in any suitable manner. For instance, the autonomous mode controller 130 may utilize a lookup table that associates tracking angles and torques. In other implementations, the autonomous mode controller 130 may utilize a function that that outputs a torque value given the current angle of the steering wheel 100 and the tracking angle. In response to determining the requested torque, the autonomous mode controller 130 may command the steering wheel motor 108 to apply the requested torque to the steering shaft 102.

The autonomous override 122 determines whether to override the autonomous mode based on input received from the angle error determiner 124 and/or the torque error determiner 126. Based on the input from the torque error determiner 126, the autonomous override 122 determines whether the vehicle is in a first torque condition, a second torque condition, or a third torque condition. The different torque conditions may correspond to different interactions between the driver and the steering wheel 100 (e.g., where the interaction with the driver is active, super active, or not active). In the case the user is not active, the autonomous override 122 does not override the autonomous mode and the vehicle continues to operate autonomously. If the autonomous override 122 determines that the vehicle is in a first torque condition (e.g., the interaction between the driver and the steering wheel 100 is super active), the autonomous override 122 overrides the autonomous mode, thereby causing the vehicle to operate in manual mode. If the autonomous override 122 determines that the vehicle is a second torque condition (e.g., the interaction between the driver and the steering wheel 100 is active), the autonomous override 122 monitors the condition of the steering wheel 100 for a predetermined amount of time to determine whether the vehicle remains in the second torque condition for the duration of the predetermined amount of time. If the driver remains active for this period, the autonomous override 122 overrides the autonomous mode, thereby causing the vehicle to operate in manual mode. The foregoing framework allows the autonomous vehicle to more readily override the autonomous mode when the interaction between the driver and the steering wheel 100 makes clear that the driver intends to override the autonomous mode, but to delay action in cases where the driver may be active but not actually intending to override the autonomous mode.

In some implementations, the autonomous override 122 may receive signals from the angle error determiner 124, whereby the signals indicate whether the autonomous override 122 should override the autonomous mode based on the measured angle of the steering wheel. In some of these implementations, the angle error determiner 124 may output an "override" signal to the autonomous override 122 when the difference between the tracking angle and the measured angle exceeds a threshold. In operation, the angle error determiner 124 determines the difference between the tracking angle that was set by the autonomous mode controller 130 and the measured angle of the steering wheel 100. In some implementations, the angle error determiner 124 outputs the override signal indicating that the difference between the tracking angle and the measured angle is greater than a threshold when the steering wheel 100 is held in such a condition for a predetermined amount of time. In some implementations, the angle error determiner 124 sets an "override" flag that indicates the difference between the tracking angle and the measured angle is greater than the threshold.

FIGS. 2A-2C illustrate examples of a tracking error and the measured angles of a steering wheel 200 in different scenarios. In FIG. 2A, the steering wheel 200 is set to a tracking angle, $\theta_{track}$. In the example of FIG. 2A, the driver is not touching the steering wheel 200. In FIG. 2B, the driver has turned the steering wheel 200 to the right. In FIG. 2B, the measured angle is $\theta_{meas}$. As can be appreciated from FIG. 2B, the driver has counteracted the torque applied to the steering wheel 200 by the steering wheel motor. In FIG. 2C, the driver has turned the steering wheel 200 to the left. In the example of FIG. 2C, the measured angle is $\theta_{meas}$. In the example, the driver has followed the torque applied to the steering wheel 200 by the steering wheel motor.

Referring back to FIG. 1B, the angle error determiner 124 receives the tracking angle from the autonomous mode controller 130. The tracking angle is the angle that is determined by the autonomous mode controller 130 and set by the steering wheel motor 108. The angle error determiner 124 receives the measured angle from the angle sensor 106. If the driver does not touch the steering wheel 100, the tracking angle and the measured angle will be substantially the same. In some implementations, the angle error determiner 124 determines the difference between the tracking angle and the measured angle according to:

$$\Delta_{Angle}=|\theta_{track}-\theta_{meas}| \tag{1}$$

where $\theta_{meas}$ is the measured angle, $\theta_{track}$ is the tracking angle, and $\Delta_{Angle}$ is the difference between the two angles. It is noted that the difference between angles may be an absolute value. The angle error determiner 124 can compare $\Delta_{Angle}$ with an angle threshold. If $\Delta_{Angle}$ is greater than the threshold, the angle error determiner 124 may continue to monitor the measured angle for a predetermined amount of time (e.g., 0.5 seconds). The angle threshold is a configurable parameter that may be determined empirically. When $\Delta_{Angle}$ is greater than the threshold for the predetermined amount of time, the angle error determiner 124 may set the override flag, thereby indicating to the autonomous override 122 that the autonomous mode should be overridden due to the angle of the steering wheel 100. In some implementations, the angle error determiner 124 continuously or substantially continuously monitors the measured angle and determines whether the difference between the tracking angle and the measured angle exceeds the threshold for the predetermined amount of time.

The torque error determiner 126 monitors the measured torque in relation to an expected torque, and determines the torque condition of the vehicle based thereon. The expected torque may be a torque value that the torque error determiner 126 expects to read from the torque sensor 104 given the requested torque and absent driver input to the steering wheel 100. The expected torque may differ from the requested torque, as the expected torque may account for other mechanical forces mentioned above that may impact the torque sensed by torque sensor 104 when the requested torque is applied. Given the requested torque, the torque error determiner 126 may determine the expected torque in any suitable manner. In some implementations, the torque error determiner 126 may utilize a lookup table or a formula that receives the requested torque and outputs an expected torque based on the requested torque. The contents of the lookup table or the parameters of the formula may be specific to the vehicle or the make of the vehicle, and may be determined empirically.

The torque error determiner 126 compares the expected torque and the measured torque, which is obtained from the torque sensor 104, to assess both the magnitude and the direction of the driver torque input by the driver to the steering wheel 100 in relation to the requested torque In some implementations, the torque error determiner 126 may filter the output of the torque sensor 104, such that any small disturbances in the measured torque are disregarded. Such small disturbances may, for example, be the result of user engagement of the steering wheel 100 that is inadvertent or without intent to take over manual control (e.g., a user's hands resting on the steering wheel 100), or other disturbances. The torque error determiner 126 may determine the difference between the expected torque and the measured torque according to:

$$\Delta_{torque}=|\tau_{expect}-\tau_{meas}| \tag{2}$$

where $\tau_{expect}$ is the expected torque, $\tau_{meas}$ is the measured torque, and $\Delta_{torque}$ is the difference between the expected torque and the measured torque. It is noted that the difference between torque values may be an absolute value. The torque error determiner 126 can compare the difference between the expected torque and the measured torque to a torque threshold. The torque threshold is a configurable parameter that may be determined empirically. The torque error determiner 126 may utilize alternate equations in lieu of equation (2). For instance, the torque error determiner 126 may implement equations that add or subtract a torque buffer value to or from the expected torque. The results are then subtracted from the measured torque and compared to zero to determine whether the measured torque is in range or outside of a range. For example, the torque error determiner 126 may perform the following logic:

IF $(\tau_{meas}-(\tau_{expected}+\tau_{buffer}))>0$ OR $\tau_{meas}-(\tau_{expected}-\tau_{buffer})<0)$ THEN: Measured Torque is out of range;
ELSE: Measured Torque is in range.

Figure 3B:
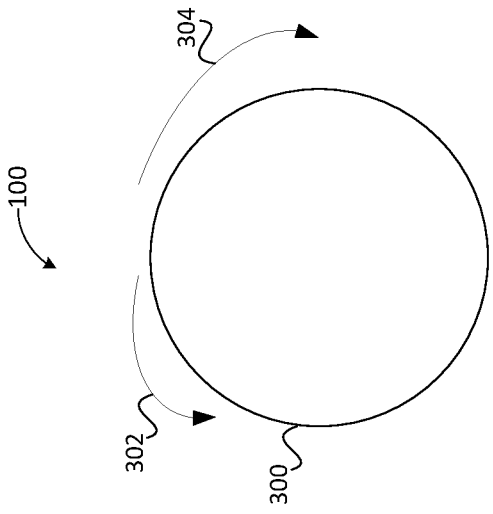
FIGS. 3A-3C are schematics that illustrate examples of different torques being applied to a steering wheel.
Figure 3C:
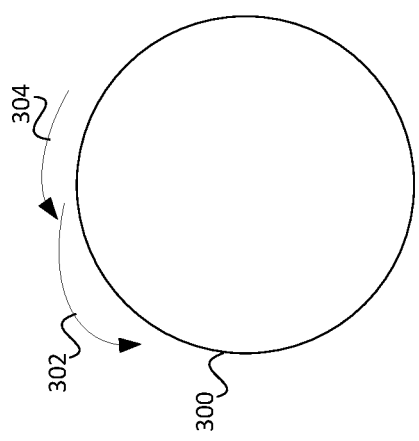
Figure 3A:
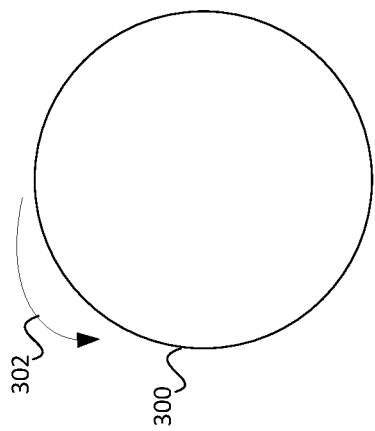

Furthermore, the torque error determiner 126 determines whether the torque applied by the driver follows or resists the expected torque (e.g., whether the driver is applying torque to the steering wheel to follow the tracking or to resist the tracking). FIGS. 3A-3C illustrate examples of torques being applied to a steering wheel 300. In FIG. 3A, the driver is not touching the steering wheel 300 with the only input torque source being the requested torque 302 applied by the steering wheel motor 108. In this scenario, the measured torque and the expected torque should be substantially the same.

In FIG. 3B, the driver is resisting the expected torque 302. In this example, the driver torque 304 being applied to the steering wheel 300 by the driver resists the expected torque 302 (i.e., is in the opposite direction), which increases the torque on the steering shaft 102. As a result, the measured torque will be greater in magnitude and in the same direction as the expected torque.

In FIG. 3C, the driver torque 304 that is applied to the steering wheel 300 by the driver follows the expected torque 302, which decreases the torque on the shaft in the direction that the requested torque 302 is applied. As a result, the measured torque will be either lower in magnitude in the same direction as the expected torque or will be in a different direction than the expected torque.

Referring back to FIG. 1B, the torque error determiner 126 outputs a first signal that indicates whether the difference between the expected torque and the measured torque exceeds the threshold torque and outputs a second signal that indicates whether, from comparing the measured torque to the expected torque, the driver is resisting or following the requested torque. The autonomous override 122 receives signals from the angle error determiner 124 and/or the torque error determiner 126 and determines whether to override the autonomous mode based thereon. In some implementations, the autonomous override 122 determines if the vehicle is in a first torque condition, a second torque condition, or a third torque condition based on the received signals.

In some scenarios, the autonomous override 122 determines that the vehicle is in the first torque condition (e.g., the interaction between the driver and the steering wheel 100 is super active) when the difference between the expected torque and the measured torque exceeds the torque threshold and the driver resists the expected torque. Put another way, if the driver is significantly pulling the steering wheel 100 in the opposite direction of the steering wheel motor 108, the autonomous override 122 concludes that the interaction between the driver and the steering wheel 100 is super active (e.g., attempting to alter the course of the vehicle). In the case that the driver is super active, the autonomous override 122 overrides the autonomous mode. In some implementations, the autonomous override 122 may output a disable signal to the autonomous mode controller 130.

In some scenarios, the autonomous override 122 determines that the vehicle is in the second torque condition (e.g., the interaction between the driver and the steering wheel 100 is active) when the difference between the expected torque and the measured torque exceeds the torque threshold and the driver follows the expected torque. Put another way, if the driver is pushing the steering wheel 100 in the same direction as the steering wheel motor 108, the driver is exerting some force on the steering wheel 100, but it is unclear that the driver wishes to disengage from the autonomous mode. When the autonomous override 122 determines that the vehicle is in the second torque condition, the autonomous override 122 determines whether the vehicle remains in this condition for a predetermined amount of time (e.g., 0.5 seconds or 1 second). If the vehicle remains in this condition for the predetermined amount of time the autonomous override 122 overrides the autonomous mode. In some implementations, the autonomous override 122 may output a disable signal to the autonomous mode controller 130.

In some implementations, the steering system 10 includes a smoothing determiner 128 that works with the autonomous mode controller 130 when the driver is following the expected torque, but not in a manner sufficient to override autonomous mode. In this scenario, the autonomous override 122 has determined that there is a difference between the measured torque and the expected torque, but that difference does not exceed the torque threshold. In this situation, the smoothing determiner 128 may determine a smoothing factor between zero (0) and one (1) based on the difference between the measured torque and the expected torque. The smoothing determiner 128 can output the smoothing factor to the autonomous mode controller 130, whereby the autonomous mode controller 130 multiplies the expected torque by the smoothing factor to obtain a smoothed torque. The autonomous mode controller 130 may then instruct the steering wheel motor 108 to apply the smoothed torque to the steering shaft 102. In this way, the driver may keep interacting with the steering wheel 100.

Figure 4:
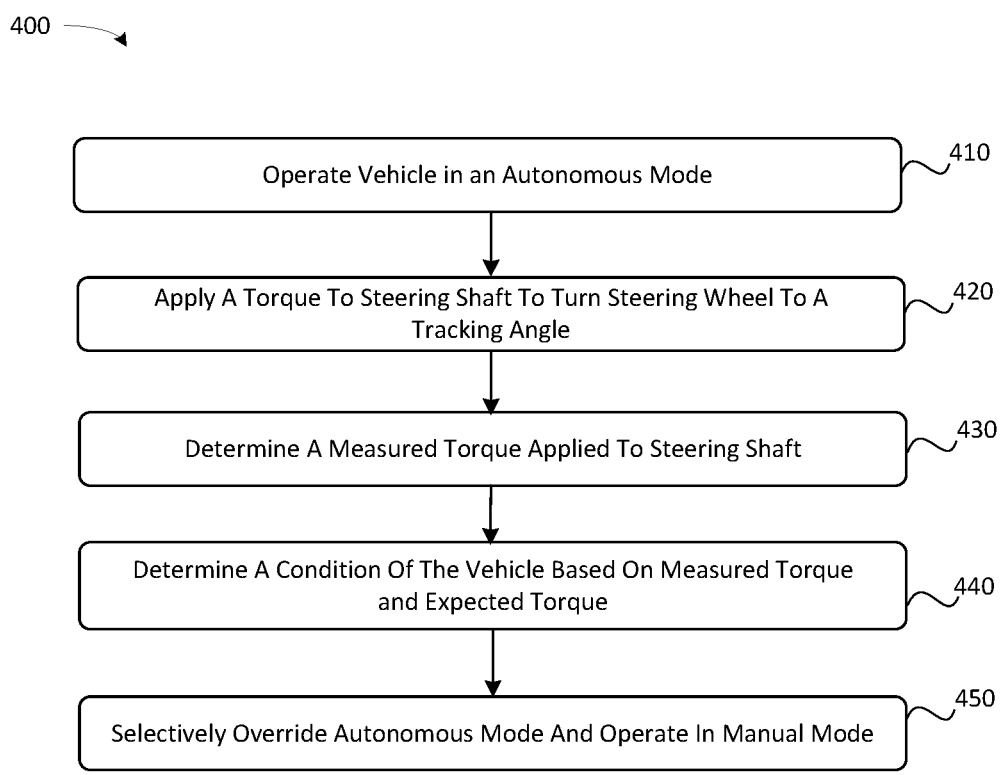
FIG. 4 is a flow chart illustrating a set of operations of a method for determining whether to override an autonomous mode of a vehicle.

FIG. 4 illustrates an example set of operations of a method 400 for determining whether to override an autonomous mode of a vehicle. The method 400 may be implemented by any suitable components of a vehicle configured to be controlled in an autonomous mode or a manual mode.

At 410, the steering controller 120 operates the vehicle in an autonomous mode. Operating the vehicle in an autonomous mode may include controlling the speed of the vehicle as well as the direction of the vehicle.

At 420, the steering controller 120 applies a requested torque to the steering shaft 102 to turn the steering wheel 100 to a tracking angle relative to the rest position of the steering wheel. In some implementations, the steering controller 120 may receive a request to adjust a trajectory of the vehicle by a certain angle (e.g., a request to adjust the tire angle). In response to the request, the steering controller 120 may command the transform component 112 to adjust the orientation of the steering linkage of the vehicle, thereby causing a change in the trajectory of the vehicle. In this way, the steering controller 120 adjusts tires to a specific tire angle. In addition to controlling the trajectory of the vehicle, the steering controller 120 may also control the orientation of the steering wheel 100, such that the driver is made aware of the current orientation of the tires by way of the orientation of the steering wheel 100. In response to receiving an instruction to adjust the trajectory of the vehicle, the steering controller 120 may further determine a tracking angle for the steering wheel 100. In some implementations, the steering controller 120 may receive a tracking angle from another component or system. In other implementations, the steering controller 120 may derive the tracking angle from the tire angle. Alternatively, the steering controller 120 may look up the tracking angle in a lookup table using the tire angle. The tracking angle indicates an angle relative to the rest position of the steering wheel 100 by which to displace the steering wheel 100. To achieve the tracking angle, the steering controller 120 applies a requested torque to the steering shaft 102. The steering controller 120 may determine an expected torque based on the requested torque. The expected torque is the value that the steering controller 120 expects to read from the torque sensor 104 given the requested torque being applied by the steering wheel motor 108.

At 430, the steering controller 120 determines a measured torque being applied to the steering shaft 102. In some instances, the driver will interact with the steering wheel 100. For example, the driver may rest his or her hands on the steering wheel 100 or may actively apply a torque to the steering wheel 100. In either scenario, the orientation of the steering wheel 100 may be altered. The steering controller 120 may obtain a torque signal from the torque sensor 104. The torque signal indicates the measured torque being applied to the steering shaft 102. Similarly, the steering controller 120 may obtain an angle signal from the angle sensor 106. The angle signal may indicate a measured angle of the steering wheel 100, which results from the measured torque being applied to the steering wheel 100.

Figure 5:
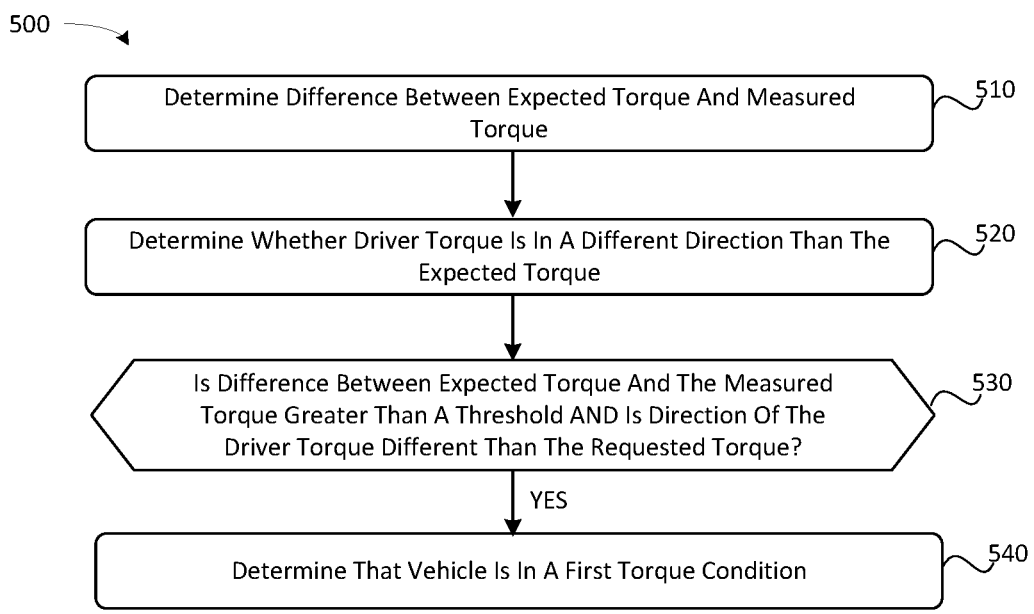
FIG. 5 is a flow chart illustrating a set of operations of a method for determining whether a vehicle is in a first torque condition.
Figure 6:
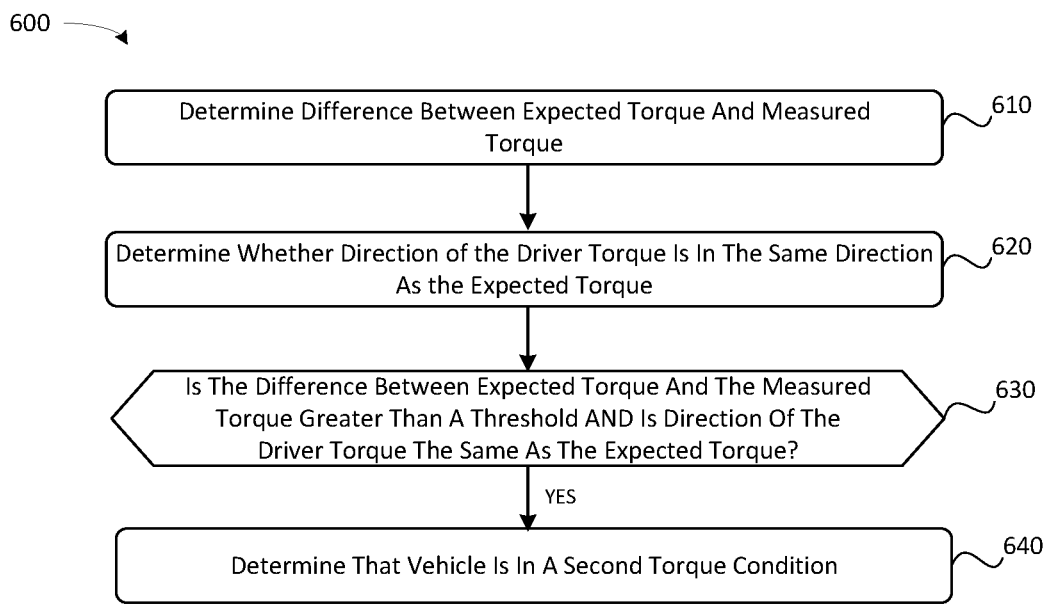
FIG. 6 is a flow chart illustrating a set of operations of a method for determining whether a vehicle is in a second torque condition.
Figure 7:
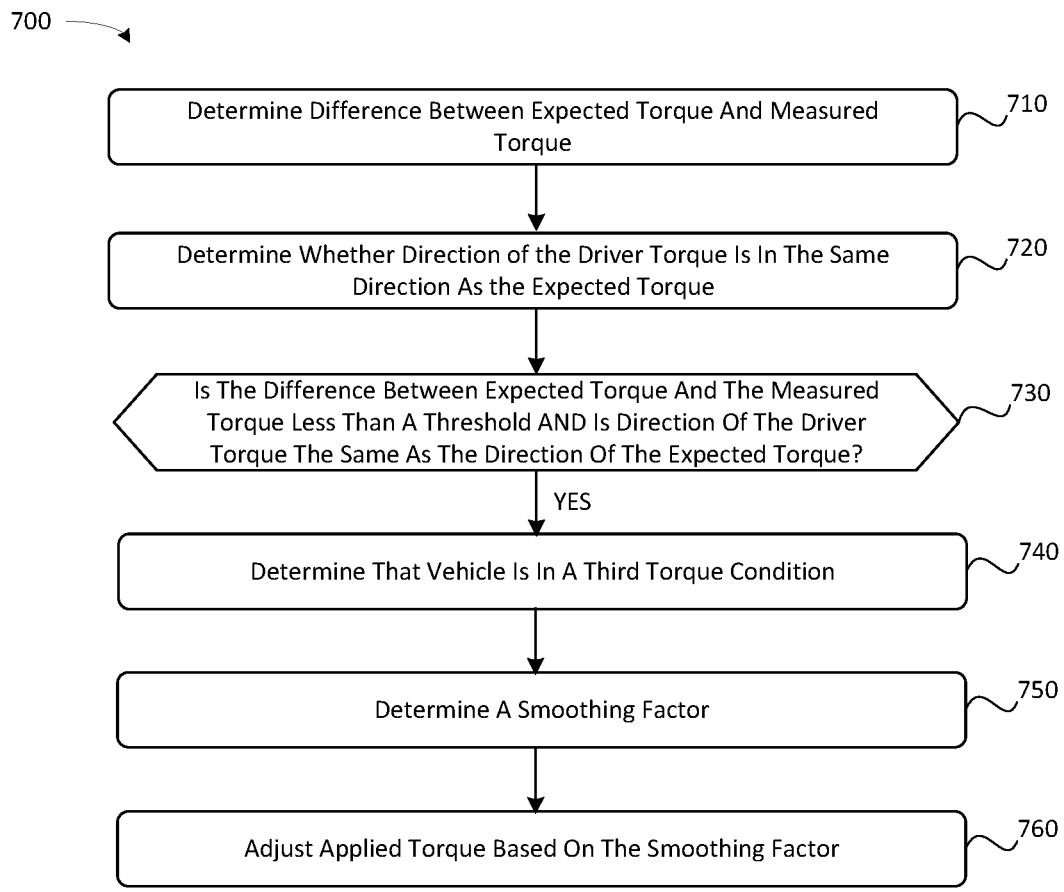
FIG. 7 is a flow chart illustrating a set of operations of a method for determining whether a vehicle is in a third torque condition.

At 440, the steering controller 120 can determine a torque condition of the vehicle based on the measured torque and the expected torque. FIGS. 5-7 illustrate examples of methods for determining the torque condition of the vehicle based on the measured torque and the expected torque.

Figure 8:
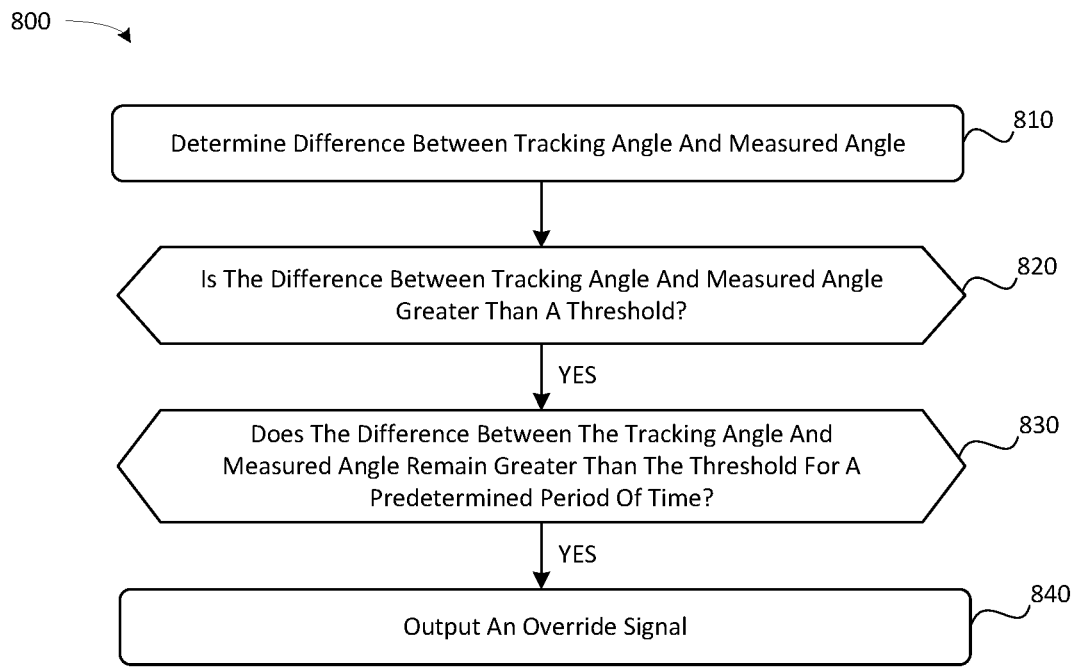
FIG. 8 is a flow chart illustrating a set of operations of a method for determining whether to override an autonomous mode of a vehicle based on a measured angle and a tracking angle.

At 450, the steering controller 120 selectively overrides the autonomous mode and operates the vehicle in manual mode based on the determined torque condition. In the scenario where the steering controller 120 determines that the vehicle is in the first torque condition (e.g., the interaction between the driver and the steering wheel 100 is super active), the steering controller 120 overrides the autonomous mode and switches operation of the vehicle to manual mode upon detection of the first torque condition. In the scenario where the steering controller 120 determines that the vehicle is in the second torque condition (e.g., the interaction between the driver and the steering wheel 100 is active), the steering controller 120 determines whether the condition remains for a predetermined amount of time before overriding the autonomous mode. For example, when from comparing the measured torque to the expected torque, the difference therebetween exceeds a torque threshold and the driver torque follows the requested torque, the vehicle is in the second torque condition. In this situation, the steering controller 120 can monitor the interaction to determine if the vehicle remains in the second torque condition for a predetermined amount of time (e.g., 0.5 seconds). If the interaction remains in the second torque condition for the predetermined amount of time, the steering controller 120 overrides the autonomous mode and switches the operation of the vehicle to manual mode. In the case where the vehicle is in the third torque condition (e.g., the interaction between the driver and the steering wheel is not active), the steering controller 120 does not override the autonomous mode. In some implementations, the steering controller 120 may further elect to override the autonomous mode based on the measured angle of the steering wheel 100 in comparison to the tracking angle. FIG. 8 illustrates an example method for determining whether to override the autonomous mode based on the measured angle and the tracking angle.

FIG. 5 illustrates an example set of operations of a method 500 for determining whether the vehicle is in the first torque condition based on the measured torque and the expected torque. As discussed, when the vehicle is detected to be in the first torque condition, the steering controller 120 overrides the autonomous mode in favor of the manual mode.

At 510, the steering controller 120 determines a difference between the expected torque and the measured torque. In some implementations, the steering controller 120 determines the difference as being the absolute value of the difference between the expected torque and the measured torque (see e.g., equation (2)).

At 520, the steering controller 120 determines whether the direction of the driver torque is different than (i.e., resists) the expected torque. Comparing the measured torque and with the expected torque allows the steering controller 120 to determine whether the driver torque resists or follows the requested torque. As referenced above, the driver may be determined to resist the requested torque if the measured torque is in the same direction (e.g., positive or negative) and greater in magnitude than the expected torque.

At 530, the steering controller 120 determines whether the difference between the expected torque and the measured torque exceeds a threshold and whether the driver torque resists (i.e., is in the opposite direction of) the expected torque. If both conditions are met (i.e., the difference between the expected torque and the measured torque exceeds the threshold AND the direction of the driver torque resists the requested torque), then the steering controller 120 determines that the vehicle is in a first torque condition (e.g., the interaction between the driver and the steering wheel 100 is super active), as shown at 540. In response to determining that the vehicle is in a first torque condition, the steering controller 120 may set a flag indicating the same.

FIG. 6 illustrates an example set of operations of a method 600 for determining whether the vehicle is in a second torque condition (e.g., the interaction between the driver and the steering wheel is active) based on a measured torque and an expected torque. As discussed, when the vehicle is in the second torque condition, the steering controller 120 overrides the autonomous mode in favor of manual mode only if the vehicle remains in the second override condition for a predetermined amount of time.

At 610, the steering controller 120 determines a difference between the expected torque and the measured torque. In some implementations, the steering controller 120 determines the difference as being the absolute value of the difference between the expected torque and the measured torque (see equation (2)).

At 620, the steering controller 120 determines whether the direction of the driver torque is the same as (i.e., follows) the direction of the expected torque. The direction of the driver torque in relation to the requested torque may be determined by comparing the measured torque to the expected torque. For example, as referenced above, the driver torque may be determined to follow the requested torque if the measured torque is either (a) in the same direction and lower magnitude than the expected torque, or (b) is in the opposite direction of the expected torque.

At 630, the steering controller 120 determines whether the difference between the expected torque and the measured torque exceeds a threshold and whether the direction of the driver torque is the same as (i.e., follows) the direction of the expected torque. If both conditions are met (i.e., the difference between the expected torque and the measured torque exceeds the threshold AND the direction of the driver torque is in the same direction as the direction of the expected torque), then the steering controller 120 determines that the vehicle is in the second torque condition, as shown at 640. As previously mentioned, the steering controller 120 does not immediately take action when the vehicle is in the second torque condition. Rather, the steering controller 120 determines whether the vehicle remains in the second override condition for a predetermined period of time, and if so, then overrides the autonomous mode in favor of the manual mode, as was discussed above with respect to operation 450 of FIG. 4.

FIG. 7 illustrates an example set of operations of a method 700 for determining whether the vehicle is in a third torque condition (e.g., the interaction between the driver and the steering wheel is not active) based on a measured torque and an expected torque. Under certain conditions, the steering controller 120 smooths the torque being applied to the axle when the interaction is not active.

At 710, the steering controller 120 determines a difference between the expected torque and the measured torque. In some implementations, the steering controller 120 determines the difference as being the absolute value of the difference between the expected torque and the measured torque.

At 720, the steering controller 120 determines whether the direction of the driver torque is in the same direction as the expected torque. The direction of the driver torque in relation to the requested torque may be determined by comparing the measured torque to the expected torque. For example, as referenced above, the driver torque may be determined to follow the requested torque if the measured torque is either (a) in the same direction and lower in magnitude than the expected torque, or (b) is in the opposite direction of the expected torque.

At 730, the steering controller 120 determines whether the difference between the expected torque and the measured torque is less than a threshold and whether the direction of the driver torque follows the direction of the expected torque. If both conditions are met (i.e., the difference between the expected torque and the measured torque is less than the threshold AND the direction of the driver torque follows the direction of the expected torque), then the steering controller 120 determines that the vehicle is in a third torque condition (e.g., the interaction between the driver and the steering wheel 100 is not active), as shown at 740. In response to determining that the interaction is not active, the steering controller 120 may set a flag indicating the same. Alternatively, the steering controller 120 may determine that the driver is inactive independent of whether the driver torque is determined to follow or resist the expected torque. In such case, the determining 720 may be omitted, and the direction is not considered in the determining 730.

When the interaction between the driver and the steering wheel 100 is not active and the driver torque follows the expected torque, the steering controller 120 may determine a smoothing factor, as shown at 750. The smoothing factor may be determined based on the difference between the measured torque and the expected torque. Furthermore, the smoothing factor may be a value between zero (0) and one (1). As the difference increases, the smoothing factor approaches zero, while as the difference decreases, the smoothing factor approaches one. At 760, the steering controller 120 applies the smoothing factor to the expected torque by multiplying the smoothing factor and the expected torque to obtain the smoothed torque. The smoothed torque can turn the steering shaft 102, whereby the transform component 112 transforms the smoothed torque into a lateral translation of the front axle of the vehicle.

FIG. 8 illustrates an example set of operations of a method 800 for determining whether to override the autonomous mode based on a measured angle and a tracking angle. At 810, the steering controller 120 determines a difference between the tracking angle and the measured angle. In some implementations, the steering controller 120 determines the difference as being the absolute value of the difference between the tracking angle and the measured angle (see e.g., equation (1)). At 820, the steering controller 120 determines whether the difference between the tracking angle and the measured angle exceeds a threshold. If the difference between the tracking angle and the measured angle is greater than the threshold, the steering controller 120 determines whether the difference between the tracking angle and the measured angle remains greater than the threshold for a predetermined amount of time, as shown at 830. When the difference between the tracking angle and the measured angle remains greater than the threshold for the predetermined amount of time, the steering controller 120 determines that the autonomous mode should be overridden in favor of manual mode. In response to making this determination, the steering controller 120 may set an "override" flag that indicates that the autonomous mode should be overridden.

The methods 400, 500, 600, 700 and 800 of FIGS. 4-8 are provided for example only. Variations of the methods are within the scope of the disclosure. Furthermore, additional operations may be performed without departing from the scope of the disclosure.

What is claimed is:

1. A method for controlling a vehicle comprising:
   operating the vehicle in autonomous mode;
   moving a steering control device according to a tracking angle;
   receiving a torque signal indicating a measured torque being applied to the steering control device and a direction of the measured torque;
   determining a difference between an expected torque and the measured torque, wherein the expected torque is a torque value expected in response to moving the steering control device according to the tracking angle;
   determining whether the vehicle is in a first torque condition based on a direction of the expected torque, the direction of the measured torque, and the difference between the expected torque and the measured torque; and
   when the vehicle is in the first torque condition, overriding the autonomous mode of the vehicle and operating the vehicle in a manual mode.

2. The method of claim 1, wherein determining whether the vehicle is in the first torque condition includes:
   comparing the difference between the expected torque and the measured torque to a threshold;
   determining whether a driver torque applied to the steering control device follows or resists the direction of the expected torque, the driver torque being determined from the direction of the expected torque, the direction of the measured torque, and the difference between the expected torque and the measured torque; and
   when the difference between the expected torque and the measured torque is greater than the threshold and the direction of the driver torque resists the direction of the expected torque, determining that the vehicle is in the first torque condition.

3. The method of claim 1, further comprising:
   receiving an angle signal indicating an angle of the steering control device; and
   determining whether to override the autonomous mode based on an expected angle and the angle of the steering control device.

4. The method of claim 3, wherein determining whether to override the autonomous mode includes overriding the autonomous mode and operating the vehicle in the manual mode when a difference between the tracking angle and the angle of the steering control device remains greater than an angle threshold for a predetermined period of time.

5. The method of claim 1, further comprising:
determining whether the vehicle is in a second torque condition based on the direction of the expected torque, the direction of the measured torque, and the difference between the expected torque and the measured torque.

6. The method of claim 5, wherein determining whether the vehicle is in the second torque condition comprises:
comparing an absolute value of the difference between the expected torque and the measured torque to a threshold;
determining whether a direction of a driver torque applied to the steering control device follows or resists the direction of the expected torque, the direction of the driver torque being determined from the direction of the expected torque, the direction of the measured torque, and the difference between the expected torque and the measured torque; and
when the absolute value of the difference between the expected torque and the measured torque is greater than the threshold and the direction of the driver torque follows the direction of the expected torque, determining that the vehicle is in the second torque condition.

7. The method of claim 6, further comprising:
when the vehicle is in the second torque condition, determining whether the vehicle remains in the second torque condition for a predetermined period of time; and
when the vehicle remains in the second torque condition for the predetermined period of time, overriding the autonomous mode of the vehicle and operating the vehicle in the manual mode.

8. The method of claim 1, further comprising:
determining whether the vehicle is in a third torque condition based on the difference between the expected torque and the measured torque.

9. The method of claim 8, wherein determining that the vehicle is in the third torque condition includes:
comparing the difference between the expected torque and the measured torque to a threshold; and
when the difference between the expected torque and the measured torque is less than the threshold, determining that the vehicle is in the third torque condition.

10. The method of claim 9, further comprising:
determining whether a direction of a driver torque applied to the steering control device follows or resists the direction of the expected torque, the driver torque being determined from the direction of the expected torque, the direction of the measured torque, and the difference between the expected torque and the measured torque; and
when the vehicle is in the third torque condition and the direction of the measured torque follows the direction of the expected torque:
determining a smoothing factor based on the difference between the measured torque and the expected torque;
determining a smoothed torque based on the expected torque and the smoothing factor; and
applying the smoothed torque to the steering control device.

11. A steering system of a vehicle that can be operated autonomously or manually, the steering system comprising:
a steering control device;
a motor that is configured to apply a torque to the steering control device;
a torque sensor that outputs a signal indicating an amount of torque being applied to the steering control device; and
a steering controller in communication with the torque sensor and the motor, the steering controller being configured to:
operate the vehicle in an autonomous mode,
instruct the motor to move the steering control device according to a tracking angle,
receive a torque signal indicating a measured torque being applied to the steering control device and a direction of the measured torque,
determine a difference between an expected torque and the measured torque, wherein the expected torque is a torque value expected in response to moving the steering control device according to the tracking angle,
determine whether the vehicle is in a first torque condition based on the direction of the expected torque, the direction of the measured torque, and the difference between the expected torque and the measured torque, and
override the autonomous mode of the vehicle and operating the vehicle in a manual mode when the vehicle is in the first torque condition.

12. The steering system of claim 11, wherein determining whether the vehicle is in the first torque condition includes:
comparing the difference between the expected torque and the measured torque to a threshold;
determining whether a direction of a driver torque applied to the steering control device follows or resists the direction of the expected torque, the driver torque being determined from the direction of the expected torque, the direction of the measured torque, and the difference between the expected torque and the measured torque; and
when the difference between the expected torque and the measured torque is greater than the threshold and the direction of the driver torque resists the direction of the expected torque, determining that the vehicle is in the first torque condition.

13. The steering system of claim 11, further comprising:
an angle sensor that outputs an angle signal indicating an angle of the steering control device,
wherein the steering controller is further configured to receive the angle signal from the angle sensor and determine whether to override the autonomous mode based on an expected angle and the angle of the steering control device.

14. The steering system of claim 13, wherein determining whether to override the autonomous mode includes overriding the autonomous mode and operating the vehicle in the manual mode when a difference between the tracking angle and the angle of the steering control device remains greater than an angle threshold for a predetermined period of time.

15. The steering system of claim 11, wherein the steering controller is further configured to determine whether the vehicle is in a second torque condition based on the direction of the expected torque, the direction of the measured torque, and the difference between the expected torque and the measured torque.

16. The steering system of claim 15, wherein determining whether the vehicle is in the second torque condition comprises:

comparing the difference between the expected torque and the measured torque to a threshold;
determining whether a direction of a driver torque applied to the steering control device by a driver follows or resists the direction of the expected torque, the driver torque being determined from the direction of the expected torque, the direction of the measured torque, and the difference between the expected torque and the measured torque; and
when the difference between the expected torque and the measured torque is greater than the threshold and the direction of the driver torque follows the direction of the expected torque, determining that the vehicle is in the second torque condition.

17. The steering system of claim 16, wherein the steering controller is further configured to:
determine whether the vehicle remains in the second torque condition for a predetermined period of time, upon determining that interaction between the driver and the steering control device is active; and
when the vehicle remains in the second torque condition for the predetermined period of time, overriding the autonomous mode of the vehicle and operating the vehicle in the manual mode.

18. The steering system of claim 11, wherein the steering controller is further configured to determine whether the vehicle is in a third torque condition based on the difference between the expected torque and the measured torque.

19. The steering system of claim 18, wherein determining that the vehicle is in the third torque condition includes:
comparing the difference between the expected torque and the measured torque to a threshold; and
when the difference between the expected torque and the measured torque is less than the threshold, determining that the vehicle is in the third torque condition.

20. The steering system of claim 19, wherein the steering controller is further configured to:
determine whether a direction of a driver torque follows or resists the direction of the expected torque, the driver torque being determined from the direction of the expected torque, the direction of the measured torque, and the difference between the expected torque and the measured torque; and
when the vehicle is in the third torque condition and the direction of the measured torque follows the direction of the expected torque:
determine a smoothing factor based on the difference between the measured torque and the expected torque,
determine a smoothed torque based on the expected torque and the smoothing factor, and
apply the smoothed torque to the steering control device.

21. A non-transitory computer-readable storage device having program instructions that, when executed by one or more processors, cause the one or more processors to perform operations, the operations comprising:
operating a vehicle in autonomous mode;
moving a steering control device of the vehicle according to a tracking angle;
receiving a torque signal indicating a measured torque being applied to the steering control device and a direction of the measured torque;
determining a difference between an expected torque and the measured torque, wherein the expected torque is a torque value expected in response to moving the steering control device according to the tracking angle;
determining whether the vehicle is in a first torque condition based on a direction of the expected torque, the direction of the measured torque, and the difference between the expected torque and the measured torque; and
when the vehicle is in the first torque condition, overriding the autonomous mode of the vehicle and operating the vehicle in a manual mode.

22. The method of claim 21, wherein determining whether the vehicle is in the first torque condition includes:
comparing the difference between the expected torque and the measured torque to a threshold;
determining whether a driver torque applied to the steering control device follows or resists the direction of the expected torque, the driver torque being determined from the direction of the expected torque, the direction of the measured torque, and the difference between the expected torque and the measured torque; and
when the difference between the expected torque and the measured torque is greater than the threshold and the direction of the driver torque resists the direction of the expected torque, determining that the vehicle is in the first torque condition.

23. The method of claim 21, further comprising:
receiving an angle signal indicating an angle of the steering control device; and
determining whether to override the autonomous mode based on an expected angle and the angle of the steering control device,
wherein determining whether to override the autonomous mode includes overriding the autonomous mode and operating the vehicle in the manual mode when a difference between the tracking angle and the angle of the steering control device remains greater than an angle threshold for a predetermined period of time.

24. The method of claim 21, further comprising:
determining whether the vehicle is in a second torque condition based on the direction of the expected torque, the direction of the measured torque, and the difference between the expected torque and the measured torque,
wherein determining whether the vehicle is in the second torque condition comprises:
comparing an absolute value of the difference between the expected torque and the measured torque to a threshold,
determining whether a direction of a driver torque applied to the steering control device follows or resists the direction of the expected torque, the direction of the driver torque being determined from the direction of the expected torque, the direction of the measured torque, and the difference between the expected torque and the measured torque,
when the absolute value of the difference between the expected torque and the measured torque is greater than the threshold and the direction of the driver torque follows the direction of the expected torque, determining that the vehicle is in the second torque condition,
when the vehicle is in the second torque condition, determining whether the vehicle remains in the second torque condition for a predetermined period of time, and
when the vehicle remains in the second torque condition for the predetermined period of time, overriding the autonomous mode of the vehicle and operating the vehicle in the manual mode.

25. The method of claim 21, further comprising:
determining whether the vehicle is in a third torque condition based on the difference between the expected torque and the measured torque, wherein determining that the vehicle is in the third torque condition includes:
  comparing the difference between the expected torque and the measured torque to a threshold, and
  when the difference between the expected torque and the measured torque is less than the threshold, determining that the vehicle is in the third torque condition;
determining whether a direction of a driver torque applied to the steering control device follows or resists the direction of the expected torque, the driver torque being determined from the direction of the expected torque, the direction of the measured torque, and the difference between the expected torque and the measured torque; and
when the vehicle is in the third torque condition and the direction of the measured torque follows the direction of the expected torque:
  determining a smoothing factor based on the difference between the measured torque and the expected torque,
  determining a smoothed torque based on the expected torque and the smoothing factor, and
  applying the smoothed torque to the steering control device.

\* \* \* \* \*